(12) United States Patent
Suzuki

(10) Patent No.: US 8,013,758 B2
(45) Date of Patent: Sep. 6, 2011

(54) WARNING DEVICE AND METHOD FOR VEHICLE

(75) Inventor: Tomoharu Suzuki, Anjo (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 336 days.

(21) Appl. No.: 12/441,863

(22) PCT Filed: Sep. 20, 2007

(86) PCT No.: PCT/JP2007/068304
§ 371 (c)(1),
(2), (4) Date: Mar. 18, 2009

(87) PCT Pub. No.: WO2008/041497
PCT Pub. Date: Apr. 10, 2008

(65) Prior Publication Data
US 2010/0060440 A1   Mar. 11, 2010

(30) Foreign Application Priority Data
Sep. 29, 2006   (JP) ................... 2006-268799

(51) Int. Cl.
*G08G 1/16* (2006.01)
(52) U.S. Cl. ........ 340/903; 340/436; 340/435; 382/103; 701/301

(58) Field of Classification Search .......... 340/436, 340/439, 425.5, 903; 382/103; 701/301
See application file for complete search history.

(56) References Cited

U.S. PATENT DOCUMENTS

| 2004/0178890 A1* | 9/2004 | Williams et al. ........... 340/425.5 |
| 2006/0164222 A1* | 7/2006 | Nou .............................. 340/435 |
| 2007/0013497 A1* | 1/2007 | Watanabe ..................... 340/435 |

FOREIGN PATENT DOCUMENTS

| EP | 1 403 138 A1 | 3/2004 |
| JP | 07-167668 A | 7/1995 |
| JP | 2001-199296 A | 7/2001 |
| JP | 2004-114977 A | 4/2004 |
| JP | 2005-18235 A | 1/2005 |
| JP | 2005-032075 A | 2/2005 |

* cited by examiner

*Primary Examiner* — Jennifer Mehmood
*Assistant Examiner* — Hongmin Fan
(74) *Attorney, Agent, or Firm* — Sughrue Mion, PLLC

(57) ABSTRACT

An obstacle detecting portion (11) on a vehicle detects an obstacle behind the vehicle. A CPU (20) detects the direction of the driver's line of sight based on a driver's face image captured by a camera (12). The CPU (20) determines whether the direction of the driver's line of sight directed to mirrors (51L, 51R) reflecting an image of the obstacle behind the vehicle. According to the result of the determination, the CPU (20) sets the level of an alarm to be outputted by warning signal outputting portions (15, 16).

10 Claims, 14 Drawing Sheets

FIG.5

| GAZING TIME t (SECOND) | REFLECTION AMOUNT x (%) | | | | | | | | | | |
|---|---|---|---|---|---|---|---|---|---|---|---|
| | 0~ | 10~ | 20~ | 30~ | 40~ | 50~ | 60~ | 70~ | 80~ | 90~ | 100 |
| 0.0~ | 10 | 10 | 10 | 10 | 10 | 10 | 10 | 10 | 10 | 10 | 10 |
| 0.5~ | 10 | 9 | 8 | 7 | 6 | 5 | 4 | 3 | 3 | 3 | 3 |
| 1.0~ | 10 | 7 | 6 | 5 | 2 | 0 | 0 | 0 | 0 | 0 | 0 |
| 1.5~ | 10 | 6 | 5 | 4 | 0 | 0 | 0 | 0 | 0 | 0 | 0 |
| 2.0~ | 10 | 5 | 4 | 0 | 0 | 0 | 0 | 0 | 0 | 0 | 0 |
| 2.5~ | 10 | 4 | 3 | 0 | 0 | 0 | 0 | 0 | 0 | 0 | 0 |
| 3.0~ | 10 | 3 | 2 | 0 | 0 | 0 | 0 | 0 | 0 | 0 | 0 |
| 3.5~ | 10 | 2 | 1 | 0 | 0 | 0 | 0 | 0 | 0 | 0 | 0 |
| 4.0~ | 10 | 1 | 0 | 0 | 0 | 0 | 0 | 0 | 0 | 0 | 0 |

VISUAL LINE DIRECTION

WARNING LEVEL

Lv=4

WARNING LEVEL

Lv=9

WARNING DEVICE AND METHOD FOR VEHICLE

TECHNICAL FIELD

The present invention generally relates to a warning device and a warning method for a vehicle.

BACKGROUND ART

A warning device, which detects an obstacle by means of a sensor when the obstacle approaches from a rear side and generates a warning signal when determining the obstacle as a danger, has been known (see Patent Application 1, as an example).

Patent Application 1: JP2001-199296A (pages 6-10 and FIG. 1)

DISCLOSURE OF INVENTION

Objects to be Solved by the Invention

However, the known warning device generates the warning signal regardless of whether or not an operator visually acknowledges the obstacle, thus annoying the operator.

The present invention is made in view of the above described conventional inconvenience, and an object of the present invention is to provide a warning device and a warning method for a vehicle for appropriately generating a warning signal to warn an operator of the vehicle.

Means to Solve an Object

According to a first aspect of the present invention, a warning device for a vehicle includes an obstacle detecting portion, a warning signal outputting portion, a mirror, a visual line direction recognizing portion, a determining portion and a warning level setting portion. The obstacle detecting portion detects an obstacle located at a rear side of the vehicle. The warning signal outputting portion outputs a warning signal when the obstacle is detected by the obstacle detecting portion. The mirror reflects an image of the obstacle. The visual line direction recognizing portion recognizes a visual line direction of an operator of the vehicle. The determining portion determines whether or not the visual line of the operator is directed towards the mirror on the basis of the visual line direction of the operator recognized by the visual line direction recognizing portion. The warning level setting portion sets a warning level of the warning signal to be outputted by the warning signal outputting portion in accordance with a determined result of the determining portion.

The determining portion determines whether or not the visual line of the operator is directed towards the mirror on the basis of the visual line of the operator recognized by the visual line direction recognizing portion and recognizes a visual line directed degree of the operator towards the mirror. The warning level setting portion sets the warning level of the warning signal to be outputted by the warning signal outputting portion on the basis of the visual line directed degree of the operator recognized by the determining portion.

The warning level setting portion lowers the warning level of the warning signal to be outputted by the warning signal outputting portion in accordance with an increase of the visual line directed degree of the operator.

The determining portion determines the visual line directed degree of the operator on the basis of a time in which the visual line of the operator is directed towards the mirror.

The obstacle detecting portion detects the obstacle and obtains positional information of the obstacle relative to the vehicle. The determining portion recognizes a reflection area of the mirror on the basis of the visual line direction of the operator recognized by the visual line recognizing portion. Further, the determining portion recognizes a ratio of an obstacle reflected area to the reflection area of the mirror on the basis of the recognized reflection area of the mirror and the positional information obtained by the obstacle detecting portion. Still further, the determining portion recognizes the visual line directed degree of the operator towards the mirror on the basis of the recognized ratio of the obstacle reflected area to the reflection area of the mirror.

The warning device further includes a memorizing portion memorizing a table for setting the warning level of the warning signal to be outputted by the warning signal outputting portion. Further, the warning level setting portion sets the warning level of the warning signal with reference to the table memorized in the memorizing portion.

The warning device further includes an operational information obtaining portion obtaining operational information when the operator of the vehicle operates a direction indicator thereof. Further, the warning level setting portion sets the warning level of the warning signal to be outputted by the warning signal outputting portion in association with the operational information obtained by the operational information obtaining portion.

The warning level setting portion sets the highest warning level of the warning signal to be outputted by the warning signal outputting portion when the determining portion determines that the visual line of the operator is not directed towards the mirror.

According to a second aspect of the present invention, a warning device for a vehicle includes an obstacle detecting portion, a warning signal outputting portion and a warning level setting portion. The obstacle detecting portion detects an obstacle located at a rear side of the vehicle and measures a distance between the vehicle and the detected object. The warning signal outputting portion outputs a warning signal when the obstacle is detected by the obstacle detecting portion. The warning level setting portion sets warning level of a warning signal to be outputted by the warning signal outputting portion on the basis of the distance measured by the obstacle detecting portion.

A warning method according to the present invention includes an obstacle detecting step for detecting an obstacle located at a rear side of the vehicle, a warning signal outputting step for outputting a warning signal when the obstacle is detected, a visual line direction recognizing step for recognizing a visual line direction of an operator of the vehicle, a determining step for determining whether or not the visual line of the operator is directed towards a mirror reflecting an image of the obstacle, and a warning level setting step for setting a warning level of the warning signal to be outputted in accordance with a result determined in the determining step.

EFFECT OF THE INVENTION

According to the present invention, a warning signal is appropriately outputted to an operator of a vehicle.

BRIEF DESCRIPTION OF DRAWINGS

FIG. 5 is a diagram illustrating a table for setting a warning level.

FIG. 6(a) illustrates a face and eyes of the operator assigned as a reference;

FIG. 6(b) illustrates a condition where only the face of the operator is directed sideways; and FIG. 6(c) illustrates a condition where the face and eyes are directed sideways.

FIGS. 12(a), 12(b) and 12(c) are diagrams illustrating a set warning level of a warning signal outputted in a condition of the specific operation (1):

FIG. 12(a) illustrates the set warning level of an acoustic warning signal outputted by a speaker; and FIG. 12(b) illustrates a message displayed by a displaying portion.

FIG. 14(a) illustrates the set warning level of the acoustic warning signal outputted by the speaker;

FIG. 14(b) illustrates an example of the message displayed by the displaying portion; and FIG. 14(c) illustrates another example of the message displayed by the displaying portion.

Figure 1:
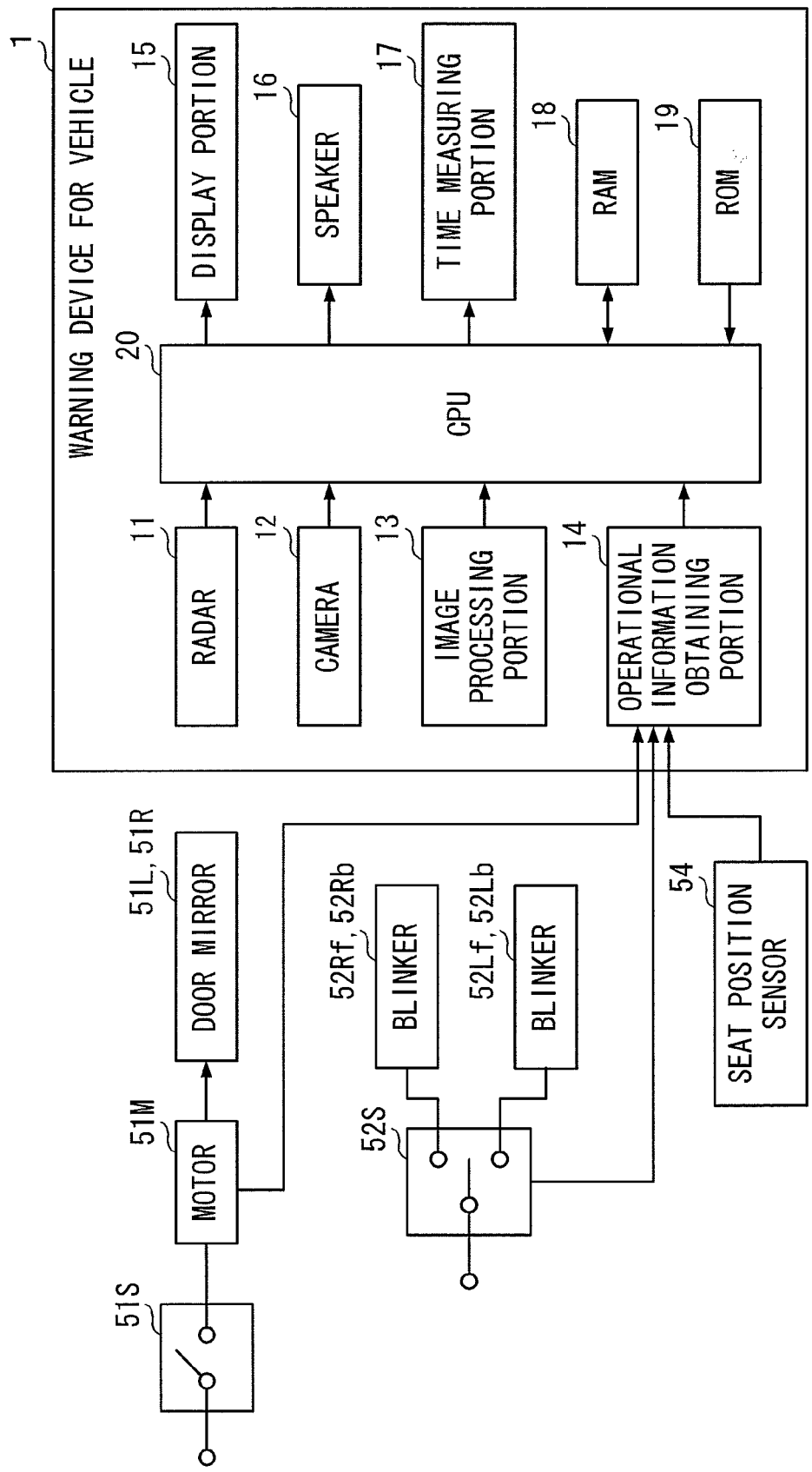
FIG. 1 is a block diagram illustrating a structure of a warning device for a vehicle according to an embodiment of the present invention.

EXPLANATION OF REFERENCE NUMERALS 1 warning device for vehicle
2 operator
11 radar (obstacle detecting portion)
12 camera
13 image processing portion
14 operational information obtaining portion
15 displaying portion (warning signal outputting portion)
16 speaker (warning signal outputting portion)
17 time measuring portion
19 ROM
20 CPU (visual line direction recognizing portion, determining portion, and warning level setting portion)
51L, 51R door mirror (mirror)

MODE FOR CARRYING OUT THE INVENTION

A device according to an embodiment of the present invention will be described hereinbelow with reference to the attached drawings. FIG. 1 illustrates a structure of a warning device 1 for a vehicle according to the embodiment. According to the embodiment, the warning device 1 for a vehicle includes a radar 11, a camera 12, an image processing portion 13, an operational information obtaining portion 14, a display portion 15, a speaker 16, a time measuring portion 17, a RAM 18, a ROM 19, and a CPU 20.

Figure 2:
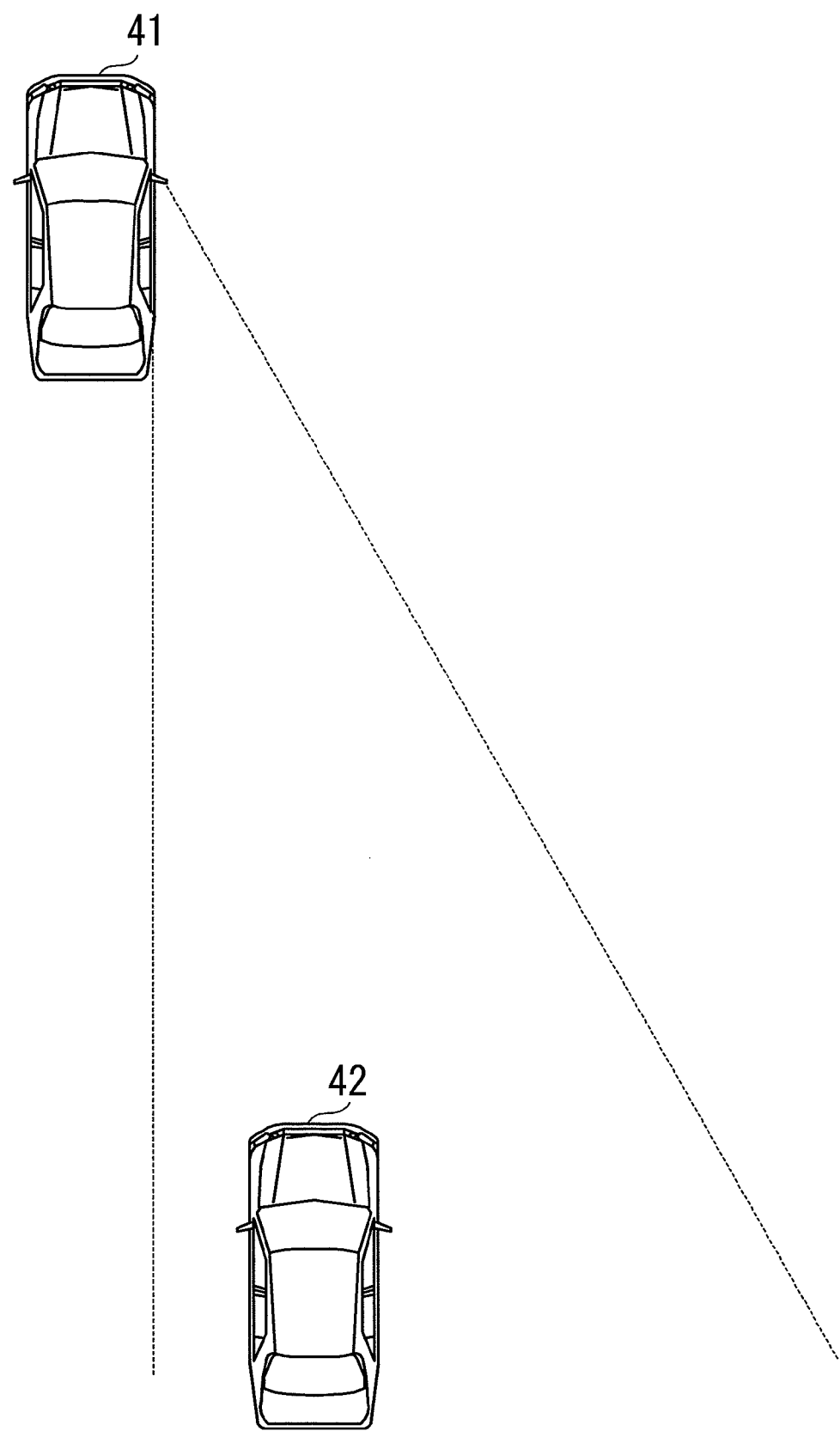
FIG. 2 is a diagram for explaining an outline of an operation of the warning device for the vehicle illustrated in FIG. 1.

In a condition where an objective vehicle 42 approaches a subjective vehicle 41 from a left/right-rear side thereof as illustrated in FIG. 2, the warning device 1 for the vehicle generates a warning signal when determining that an operator 2 of the subjective vehicle 41 does not recognize the approach of the objective vehicle 42.

In order to appropriately generate the warning signal, the warning device 1 is arranged to set a level (warning level) of the warning signal to be outputted in response to a recognition level, at which the operator 2 recognizes the objective vehicle 42.

Figure 3:
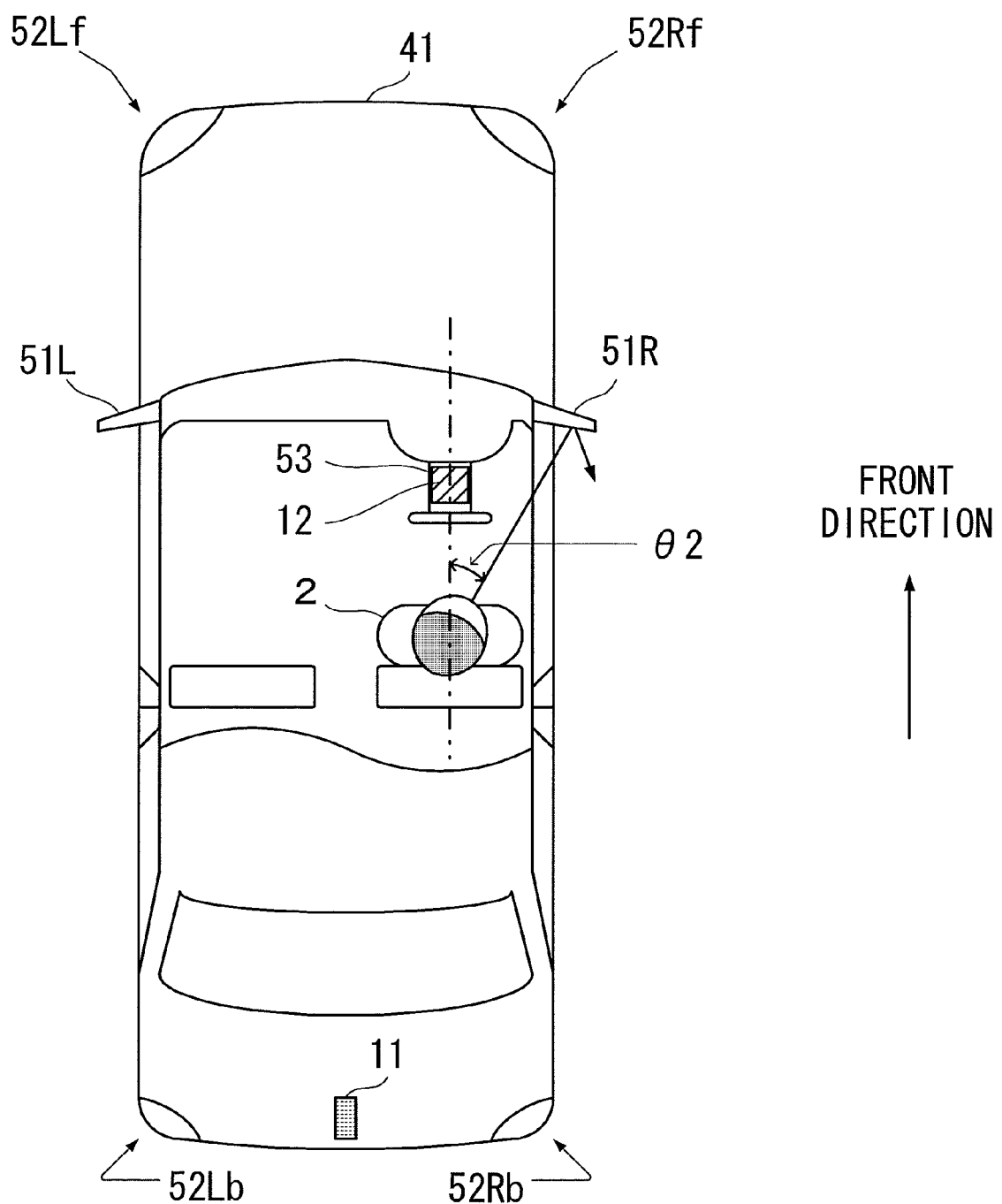
FIG. 3 is a diagram illustrating a structure of a subjective vehicle.

As illustrated in FIG. 3, door mirrors 51L and 51R for reflecting an image of the objective vehicle 42 are provided at left and right side portions of the subjective vehicle 41, respectively, so that the operator 2 of the subjective vehicle 41 acknowledges a rear side of the subjective vehicle 41. Further, blinkers 52Lf, 52Lb, 52Rf and 52Rb, which are operated to blink when the subjective vehicle 41 changes lanes, are provided at four corners of the subjective vehicle 41, respectively.

The radar 11 detects the objective vehicle 42, which is assigned as an obstacle approaching the subjective vehicle 41 from the rear side thereof, and measures a distance between the subjective vehicle 41 and the objective vehicle 42. Thus, the radar 11 is employed for obtaining positional information of the objective vehicle 42 relative to the subjective vehicle 41. A laser radar, a millimeter wave radar, an ultrasonic radar, a Doppler sonic radar, and the like, are employed as the radar 11 as an example. As illustrated in FIG. 3, the radar 11 is assembled onto a rear portion of the subjective vehicle 41.

Figure 4:
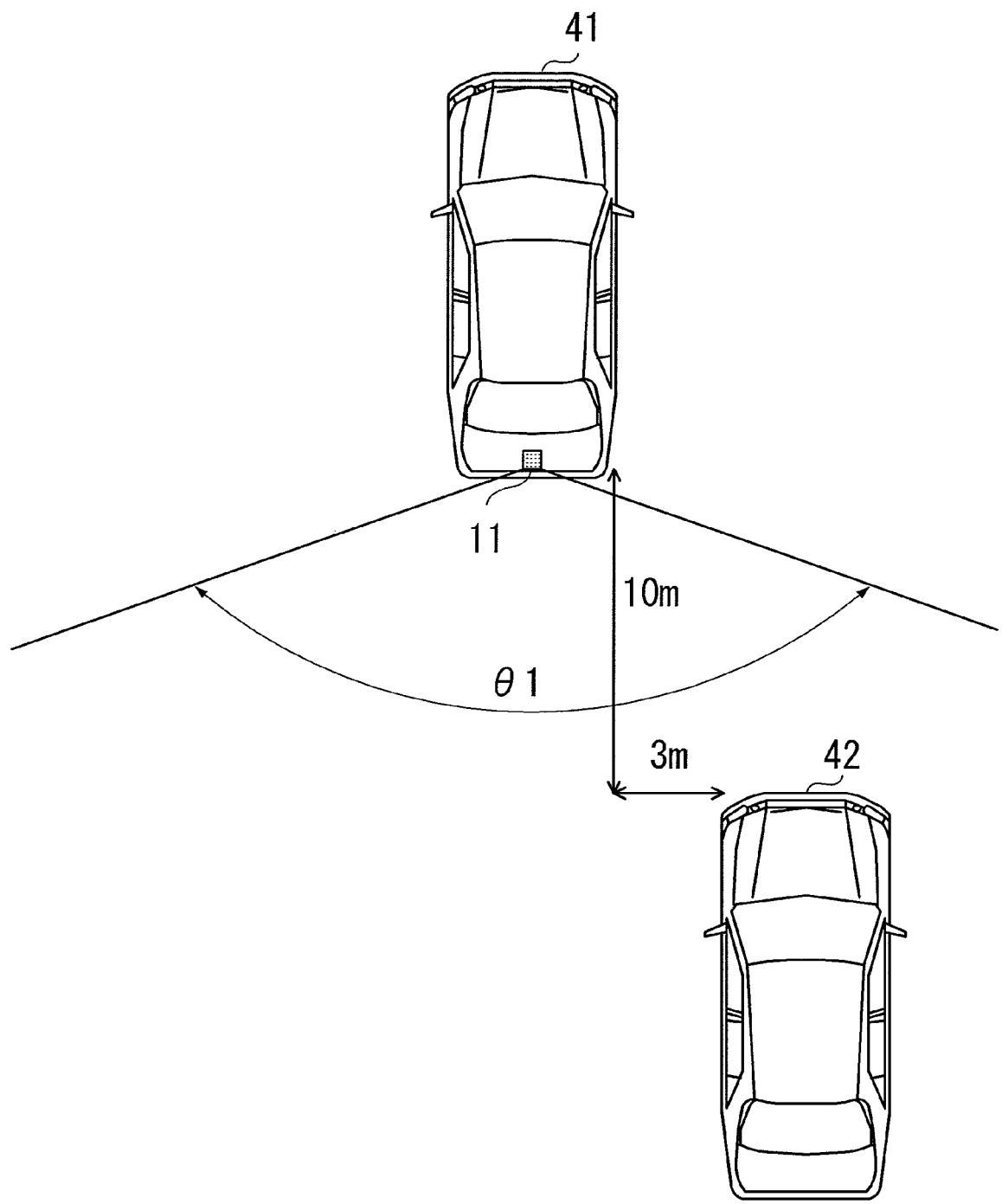
FIG. 4 is a diagram for explaining a detection of an objective vehicle.

As illustrated in FIG. 4, the radar 11 detects the objective vehicle 42, which is positioned at a right-rear side of the subjective vehicle 41, within a range of a detection angle θ1, for example. Then, as an example, the radar 11 detects a distance therefrom to the objective vehicle 42 in a vertical direction relative to a rear side surface of the subjective vehicle 41 (10 m, for example) and a distance therefrom to the objective vehicle 42 in a vertical direction relative to a right side surface of the subjective vehicle 41 (3 m, for example) as the positional information of the objective vehicle 42. When detecting the objective vehicle 42, the radar 11 supplies information of the distance between the subjective vehicle 41 and the objective vehicle 42 and the obtained positional information to the CPU 20 along with the information of the detection of the objective vehicle 42.

The camera 42 captures a face of the operator 2 of the subjective vehicle 41. As illustrated in FIG. 3, the camera 12 is assembled onto a rod 53 of a handle of the subjective vehicle 41.

Back to FIG. 1, the image processing portion 13 processes a facial image of the operator 2 captured by the camera 12. The image processing portion 13 binarizes the facial image to create a binary image. Further, the image processing portion 13 processes the binary image to create an edge image. Thus, the image processing portion 13 obtains the facial image of the operator 2, which is represented by edges of at least a facial contour, eyes and a nose of the operator 2, as a general characteristic of the operator 2.

Further, the image processing portion 13 obtains a center of a pupil of the operator 2 and a Purkinje image from the facial image of the operator 2. The Purkinje image is an image of a point light source (camera) reflected in a surface of an eyeball of the operator 2.

The subjective vehicle 41 further includes a motor 51M, switches 51S, 52S and a seat position sensor 54.

The motor 51M actuates the door mirrors 51L and 51R in an up-down direction and in a left-right direction. The motor 51M includes an encoder for detecting a rotational angle thereof.

The switch 51S is employed for actuating the door mirrors 51L and 51R. The switch 51S is operated by the operator 2, thereby connecting an electric source (not illustrated) and the motor 51M.

The switch 52S is operated when the operator 2 of the subjective vehicle 41 intends to change lanes. When operated by the operator 2, the switch 52S connects the electric source and the blinkers 52Lf and 52Lb, which are used when the subjective vehicle 41 changes the lanes in the left direction, or the electric source and the blinkers 52Rf and 52Rb, which are used when the subjective vehicle 41 changes the lanes in the right direction.

The seat position sensor 54 is employed for detecting a position of a seat, on which the operator 2 is seated, relative to the camera 12.

The operational information obtaining portion 14 is employed for obtaining operational information of the operator 2. The operational information obtaining portion 14 detects angles of the door mirror 51L and 51R in the up-down direction and in the left-right direction by detecting the rotational angle of the motor 51M when the operator 2 operates the switch 51S.

The operational information obtaining portion 14 further obtains operational information when the operator 2 of the subjective vehicle 41 operates the switch 52S. Still further, the operational information obtaining portion 54 obtains positional information of the seat from the seat position sensor 54. Then, the operational information obtaining portion 14 supplies such operational information to the CPU 20.

The display portion 15 includes, for example, a liquid crystal display, and displays thereon various indications. The display portion 15 is used as a warning device for drawing the attention of the operator 2 of the subjective vehicle 41 by displaying indications thereon. A displaying portion for a navigation system may be employed as the display portion 15. The CPU 20 controls the display portion 15, and the display portion 15 displays the indications as an output of a warning signal in response to a set warning level.

The speaker 16 generates sounds outputted from a car audio system and a radio system of the subjective vehicle 41. The speaker 16 is used as an acoustic warning device. The CPU 20 controls the speaker 16, and the speaker 16 outputs an acoustic warning signal with a volume corresponding to the set warning level.

The time measuring portion 17 measures time. The RAM 18 is an operational memory device for memorizing data required for processes of the CPU 20.

The ROM 19 memorizes data, such as a program, message data, and the like, which are required for the processes of the CPU 20. The ROM 19 memorizes a program data of a warning process for the vehicle, which will be described hereinbelow, as the data of the program.

The ROM 19 further memorizes a table for setting the warning level as illustrated in FIG. 5. In this table, a reflection amount x indicates a ratio (%) of an objective vehicle-reflected area to a reflecting area of the door mirror 51L/51R (i.e., a reflecting range of the door mirror 51L/51R, which can be seen by the operator 2).

A gazing time t indicates a time in which the visual line of the operator 2 is directed towards the door mirror 51L/51R. A time period in which the visual line of the operator 2 is continuously directed towards the door mirror 51L/51R may be assigned as the gazing time t. Alternatively, a total of several time periods, in which the visual line of the operator 2 is directed towards the door mirror 51L/51R, in a certain time, may be assigned as the gazing time t.

The table indicates a relationship between the reflection amount x, the gazing time t and the warning level. The warning level is set within 0-10. The lower value indicates the lower warning level.

The CPU 20 controls the warning device 1 for the vehicle. When information of the detection of the objective vehicle 42 is supplied to the CPU 20 from the radar 11, the CPU 20 reads the program for the warning process from the ROM 19 and executes the program.

First, the CPU 20 recognizes a visual line direction $\theta 2$ of the operator 2 as illustrated in FIG. 3. In order to recognize the visual line direction $\theta 2$ of the operator 2, the CPU 20 obtains the edge image of the face of the operator 2 from the image processing portion 13.

Figure 6A:
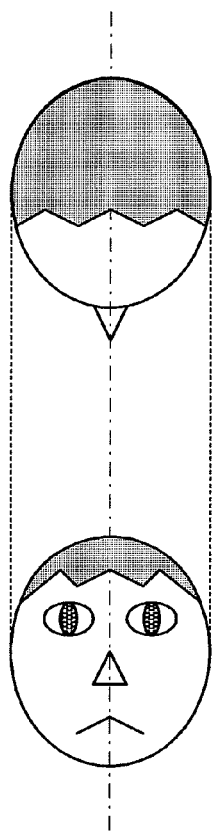
FIGS. 6(a), 6(b) and 6(c) are diagrams illustrating operations for obtaining an orientation of a face and a visual line direction of an operator of the vehicle.
Figure 6B:
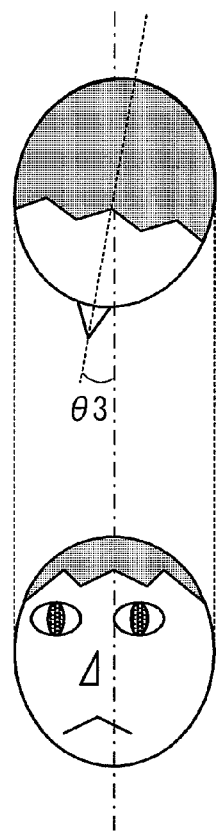
Figure 6C:
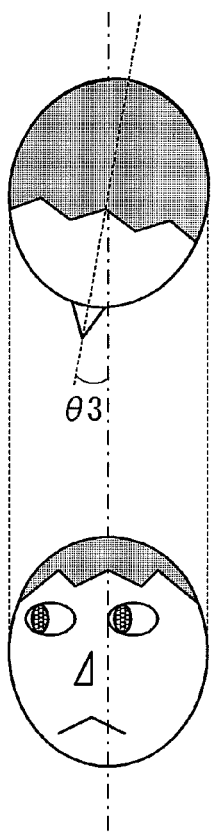

The CPU 20 recognizes an angle of the face ($\theta 3$) and an angle of the eyeballs ($\theta 4$) of the operator 2 with reference to a condition where the operator 2 faces a front direction as illustrated in FIG. 6($a$).

The ROM 19 memorizes a relative relationship between the angle of the face and the facial image of the operator 2 in advance. When the angle of the face of the operator 2 is in a condition as illustrated in FIG. 6($b$), the CPU 20 obtains the angle of the face of the operator 2 with reference to the relative relationship between the angle of the face and the facial image of the operator 2, which is memorized in the ROM 19.

Further, in a condition where not only the face of the operator 2 but also the eyeballs of the operator 2 are directed sideways as illustrated in FIG. 6($c$), the CPU 20 calculates the angle of the eyeballs ($\theta 4$) of the operator 2. The angle of the face ($\theta 3$) is obtained with reference to a position of the camera 12, and the angle of the eyeballs is obtained with reference to the direction of the face of the operator 2. The CPU 20 calculates the visual line angle of the operator 2 on the basis of a relative positional relationship between the center of the pupil of the operator 2 and the Purkinje image, which are obtained by the image processing portion 13.

Figure 7:
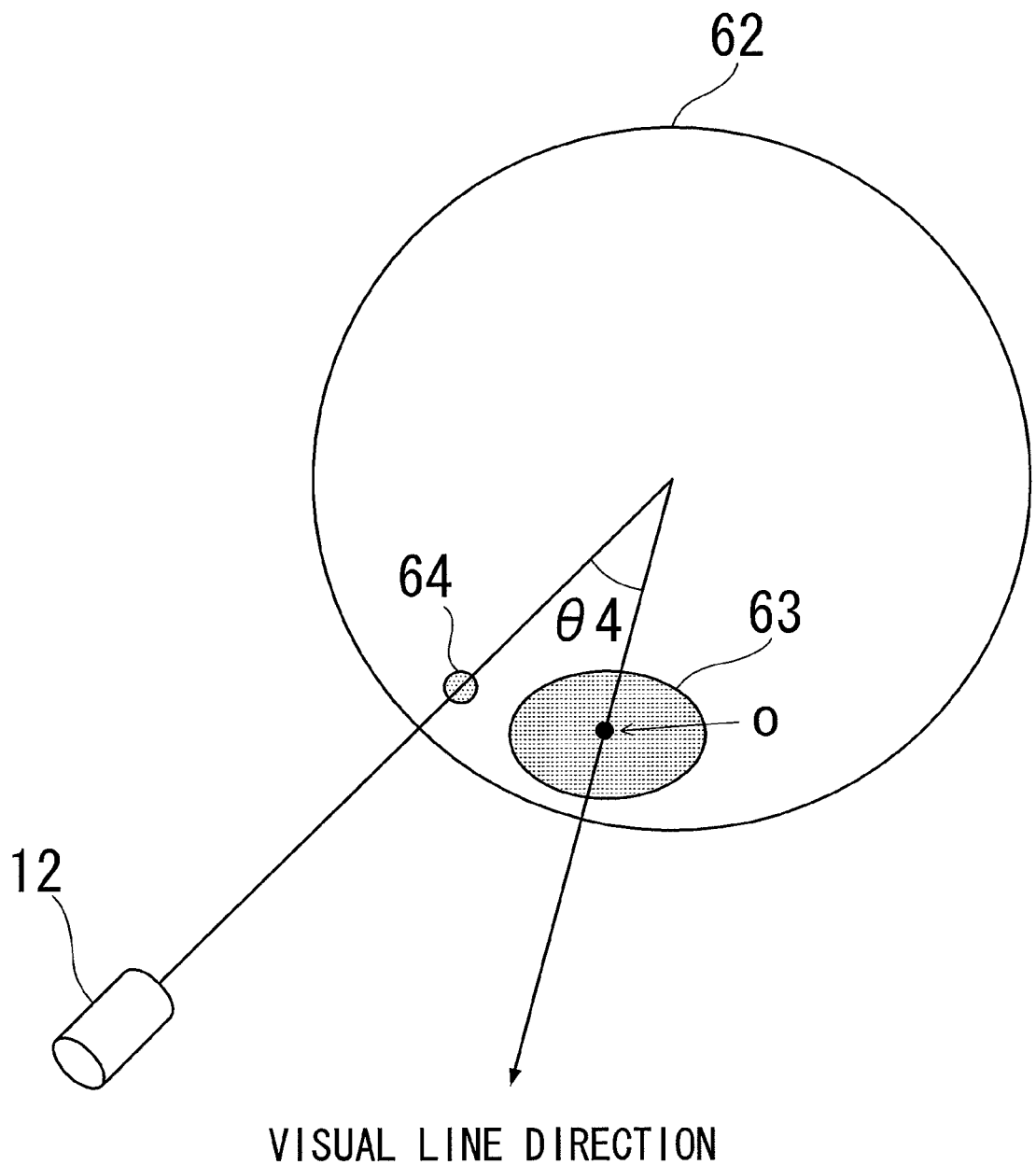
FIG. 7 is a diagram illustrating an operation for obtaining a visual line of the operator.

As illustrated in FIG. 7, assuming that a distance between an eyeball 62 and the camera 12 has been already determined, the CPU 20 calculates the angle of the eyeball ($\theta 4$) on the basis of a positional relationship between a center O of a pupil 63 in the image and a center of a Purkinje image 64.

The CPU 20 recognizes the latest visual line direction $\theta 2$ of the operator 2 on the basis of the angle of the face ($\theta 3$) and the angle of the eyeball ($\theta 4$) of the operator 2.

When the CPU 20 recognizes the visual line direction $\theta 2$ of the operator 2 as described above, the CPU 20 determines whether or not the visual line of the operator 2 is directed towards the door mirror 51L/51R on the basis of the recognized visual line direction $\theta 2$.

When the CPU 20 determines that the visual line of the operator 2 is directed neither to the door mirror 51L nor to the door mirror 51R, the CPU 20 refers to the table of the ROM 19.

With reference to the table of the ROM 19, when the gazing time t is 0.0 seconds, the warning level is assigned as 10 at any percentages of the reflection amount x. In such a condition, the CPU 20 sets the warning level as 10.

Further, when the operational information of the switch 52S for operating the blinkers 52Lf, 52Lb, 52Rf and 52Rb is supplied to the CPU 20 from the operational information obtaining portion 14, the CPU 20 recognizes that the operator 2 intends to change the lanes and determines that the operator 2 gazes the objective vehicle 42. In such a condition, the CPU 20 sets the warning level as 0.

When the CPU 20 recognizes that the visual line of the operator 2 is directed towards the door mirror 51L/51R and the operational information of the switch 52S is not supplied to the CPU 20 from the operational information obtaining portion 14, the CPU 20 recognizes a visual line directed degree of the operator 2 towards the door mirror 51L/51R in order to set the warning level.

The CPU 20 recognizes the visual line directed degree on the basis of the reflection amount x, which indicates the ratio of the objective vehicle-reflected area to the reflecting area of the door mirror 51L/51R, and the gazing time t, which indicates the time in which the visual line of the operator 2 is directed towards the door mirror 51L/51R.

First, the CPU 20 detects a three-dimensional facial position on the basis of the image of the operator 2, which is captured by the camera 12, and the positional information of the seat, which is supplied from the operational information obtaining portion 14.

Figure 8:
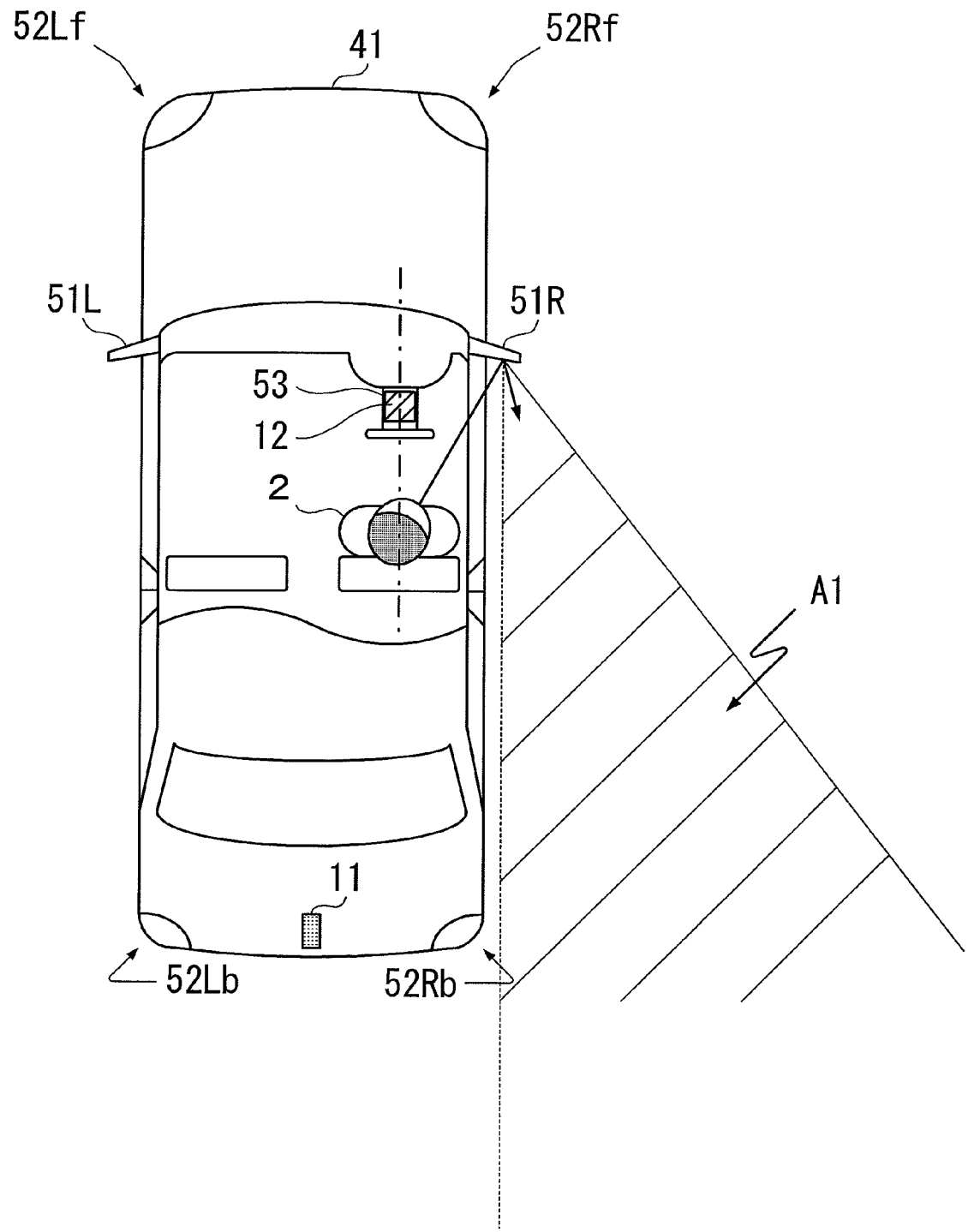
FIG. 8 is a diagram illustrating an operation for specifying a reflection area of a mirror.

When the CPU 20 detects the three-dimensional facial position, the CPU 20 recognizes the reflecting area of the door mirror 51L/51R, which is seen by the operator 2 as illustrated in FIG. 8, on the basis of the three-dimensional facial position and the mirror angles, which are supplied from the operational information obtaining portion 14, of the door mirror 51L/51R in the up-down direction and the left-right direction. In the example illustrated in FIG. 8, a mirror reflecting area A1, which is obtained when the operator 2 watches the door mirror 51R, is indicated.

Figure 9:
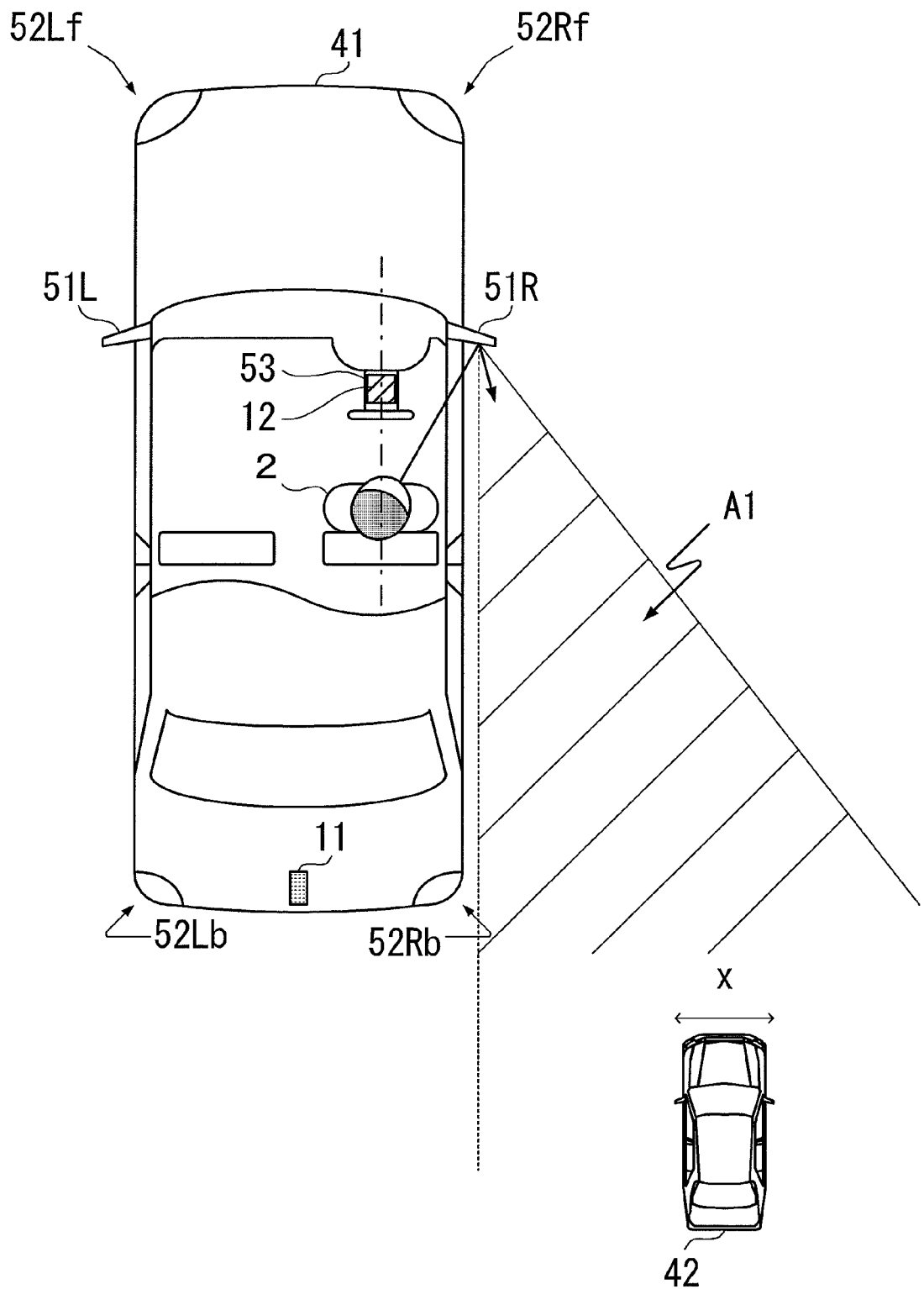
FIG. 9 is a diagram for explaining a reflection amount of the objective vehicle.

When the CPU 20 recognizes the mirror reflecting area A1, the CPU 20 obtains the reflection amount x (%) relative to the mirror reflecting area A1, as illustrated in FIG. 9, by means of the positional information of the objective vehicle 42 which is obtained in advance.

Further, the CPU 20 obtains the gazing time t in which the visual line of the operator 2 is directed towards the door mirror 51L/51R. The CPU 20 obtains, from the time measuring portion 17, a time at which the visual line of the operator 2 of the subjective vehicle 41 is directed towards the door mirror 51L/51R, and a time at which the visual line of the operator 2 is withdrawn therefrom. The CPU 20 obtains the gazing time t in which the visual line of the operator 2 is directed towards the door mirror 51L/51R from the above described obtained times.

When the CPU 20 obtains the reflection amount x (%) of the objective vehicle 42 and the gazing time t, the CPU 20 sets the warning level with reference to the table of the ROM 19.

Then, the CPU 20 controls the display portion 15 and the speaker 16 so as to output the warning signal at the set warning level.

Next, an operation of the warning device 1 of the vehicle according to the embodiment will be described hereinafter. When detecting the objective vehicle 42, the radar 11 supplies detection information indicating the approach of the objective vehicle 42 to the CPU 20.

Figure 10:
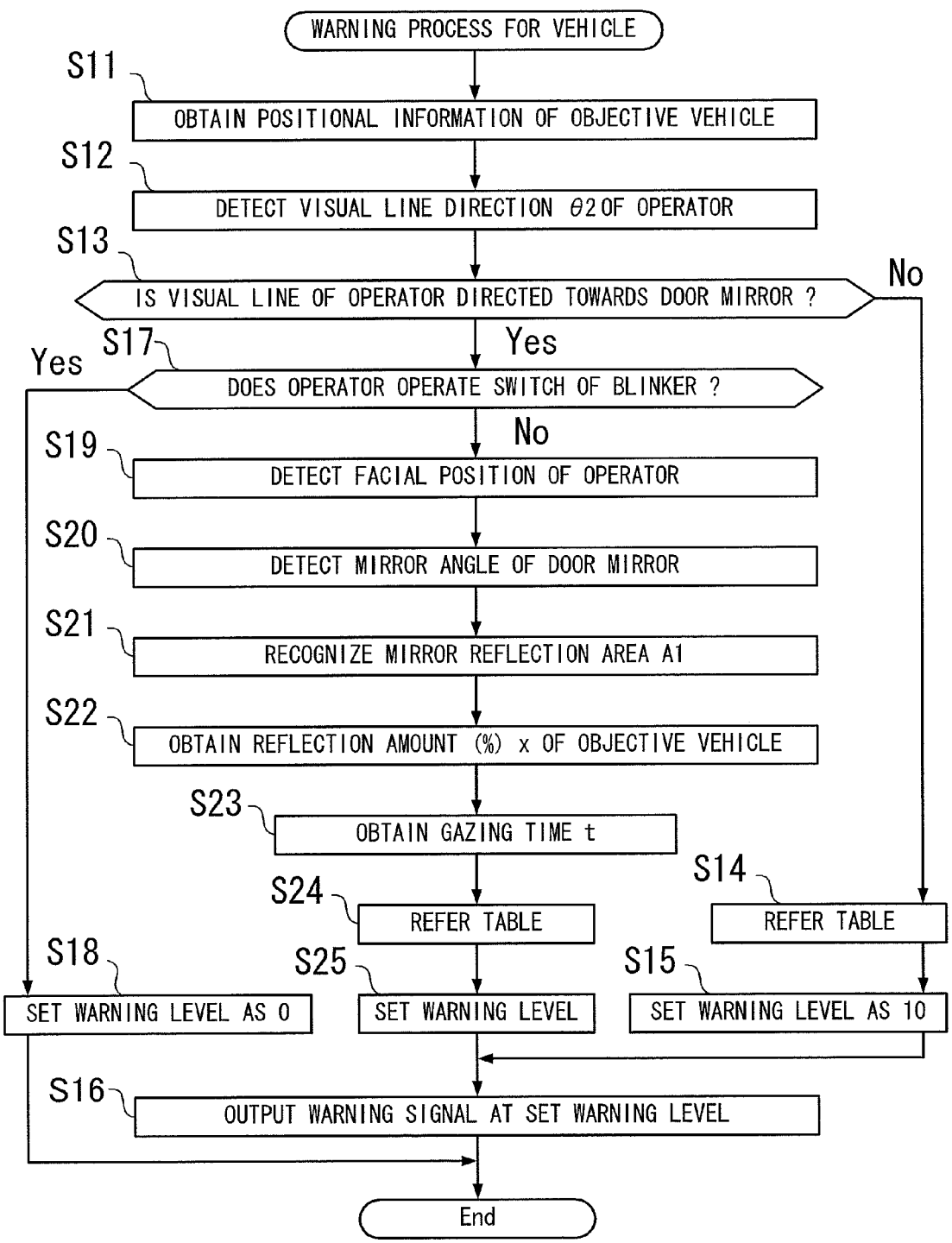
FIG. 10 is a flowchart illustrating a warning process for a vehicle executed by a CPU illustrated in FIG. 1.

When supplied with the detection information from the radar 11, the CPU 20 reads the program data of the warning process from the ROM 19 and executes the warning process in accordance with a flowchart illustrated in FIG. 10.

The CPU 20 obtains the positional information of the objective vehicle 42 located at the rear side of the subjective vehicle 41 on the basis of distance information outputted from the radar 11 (Step S11).

The CPU 20 obtains the facial image of the operator 2 from the image processing portion 13 and detects the visual line direction θ2 of the operator 2 on the basis of the obtained facial image of the operator 2 (Step S12).

Then, the CPU 20 determines whether or not the visual line of the operator 2 is directed towards the door mirror 51L/51R on the basis of the detected visual line direction θ2 of the operator 2 (Step S13).

When the CPU 20 determines that the visual line of the operator 2 is directed neither to the door mirror 51L nor to the door mirror 51R ("No" in Step S13), the CPU 20 refers to the table of the ROM 19 (Step S14).

Because the gazing time t is 0, the CPU 20 sets the warning level as 10 (Step S15).

The CPU 20 controls the display portion 15 and the speaker 16 to output the warning signals in accordance with the set warning level (Step S16). Then, the CPU 20 terminates the operation.

On the other hand, when the CPU 20 determines that the visual line of the operator 2 is directed towards the door mirror 51L/51R ("Yes" in Step S13), the CPU 20 determines whether or not the switch 52S for the blinkers 52Lf, 52Lb, 52Rf and 52Rb is operated on the basis of the operational information supplied from the operational information obtaining portion 14 (Step S17).

When the CPU 20 determines that the switch 52S is operated ("Yes" in Step S17), the CPU 20 sets the warning level as 0 (Step S18) and terminates the warning process for the vehicle.

On the other hand, when the CPU 20 determines that the switch 52S is not operated ("No" in Step S17), the CPU 20 detects the three-dimensional facial position on the basis of the image of the operator 2, which is captured by the camera 12, and the positional information of the seat, which is supplied from the operational information obtaining portion 14 (Step S19).

When detecting the three-dimensional facial position, the CPU 20 detects the mirror angle of the door mirror 51L/51R in the up-down direction and in the left-right direction (Step S20).

Then, the CPU 20 recognizes the mirror reflecting area A1 on the basis of the visual line direction θ2 of the operator 2, the detected three-dimensional facial position, and the mirror angle, which is supplied from the operational information obtaining portion 14, of the door mirror 51L/51R in the up-down direction and in the left-right direction (Step S21).

The CPU 20 obtains the reflection amount x of the objective vehicle 42 which is reflected in the door mirror 51L/51R relative to the mirror reflection area A1 (Step S22).

The CPU 20 obtains a start time, at which the operator 2 starts gazing the door mirror 51L/51R, and an end time, at which the operator 2 terminates to gaze the door mirror 51L/51R, and obtains the gazing time t of the door mirror 51L/51R on the basis of the obtained start time and the end time (Step S23).

The CPU 20 refers to the table of the ROM 19 (Step S24). Then, the CPU 20 sets the warning level in accordance with the content of the table of the ROM 19 (Step S25).

The CPU 20 controls the display portion 15 and the speaker 16 to output the warning signals in accordance with the set warning level (Step S16). Then, the CPU 20 terminates the operation.

Figure 11:
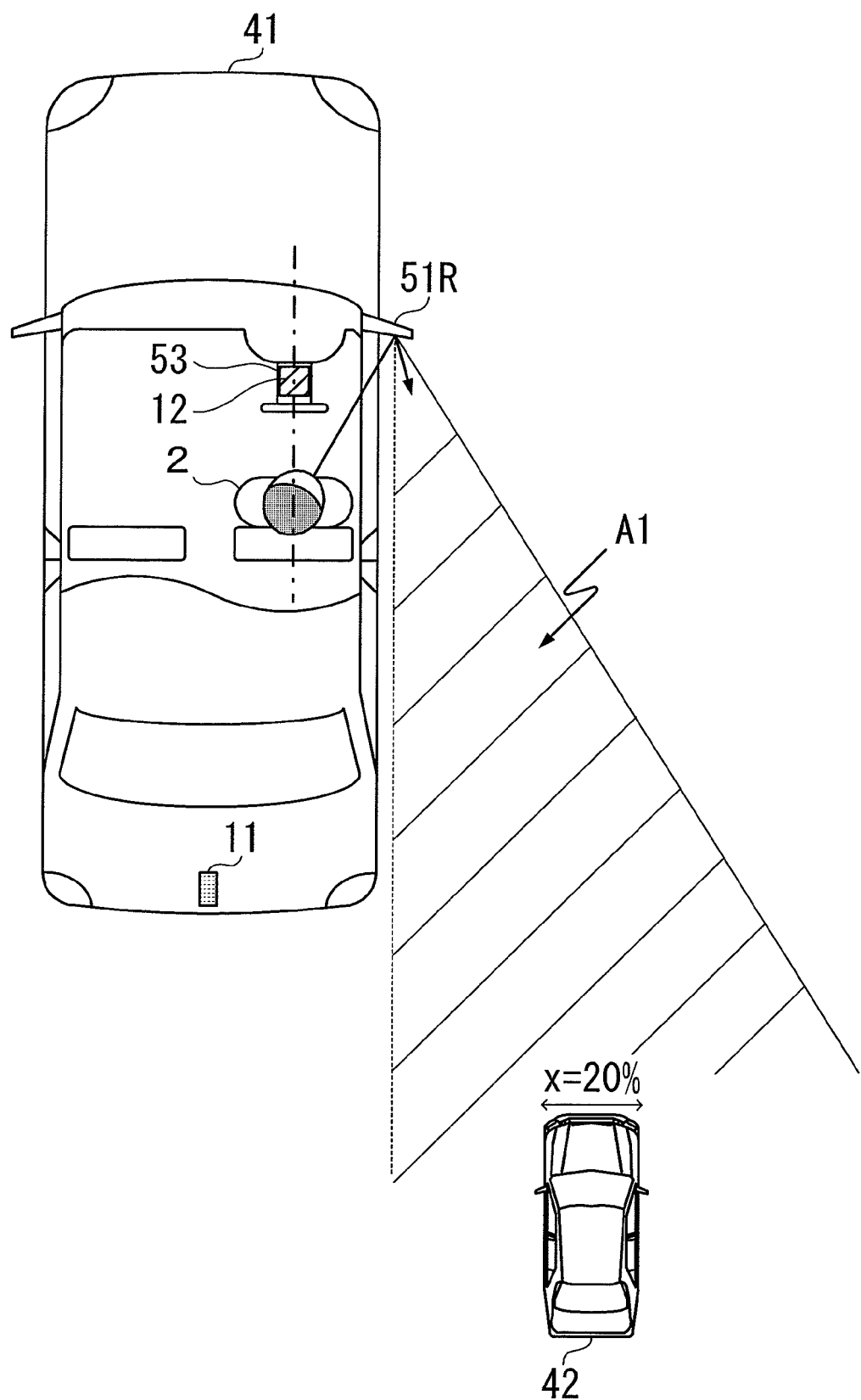
FIG. 11 is a diagram illustrating a specific operation (1) of the warning device for the vehicle.

Next, the operation of the warning device 1 for the vehicle will be described hereinbelow with a specific example. Herein, in a condition where the objective vehicle 42 approaches the subjective vehicle 41 to a position as indicated in FIG. 11, the reflection amount x is assigned as 20% and the gazing time t is assigned as 2.0 seconds.

When the CPU 20 refers to the table illustrated in FIG. 5 in such a condition (the process in Step S24), a warning level Lv is assigned as "4". Therefore, the CPU 20 sets the warning level Lv as "4" (the process in Step S25). Then, the CPU 20 controls the display portion 15 and the speaker 16 to output the warning signals at the set warning level Lv (the process in Step S16).

Figure 12A:
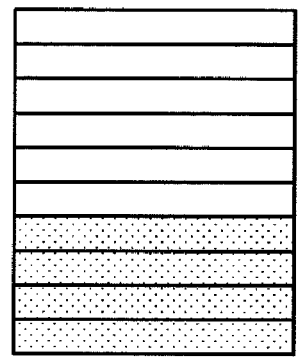
Figure 12B:
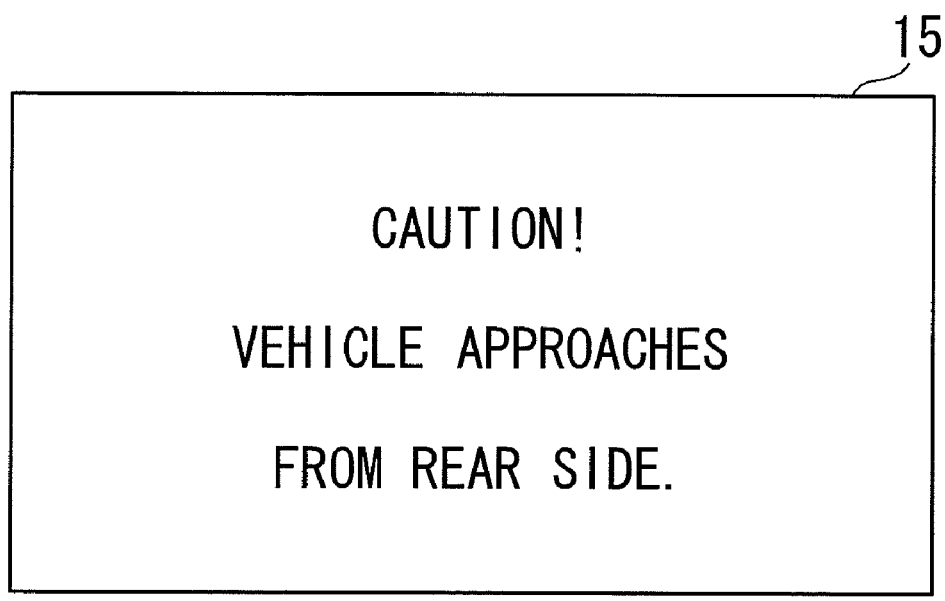

The speaker 16 outputs a sound with a volume corresponding to the warning level Lv which is set as "4" as illustrated in FIG. 12(a), for example. The display portion 15 displays a message thereon as illustrated in FIG. 12(b), for example.

Figure 13:
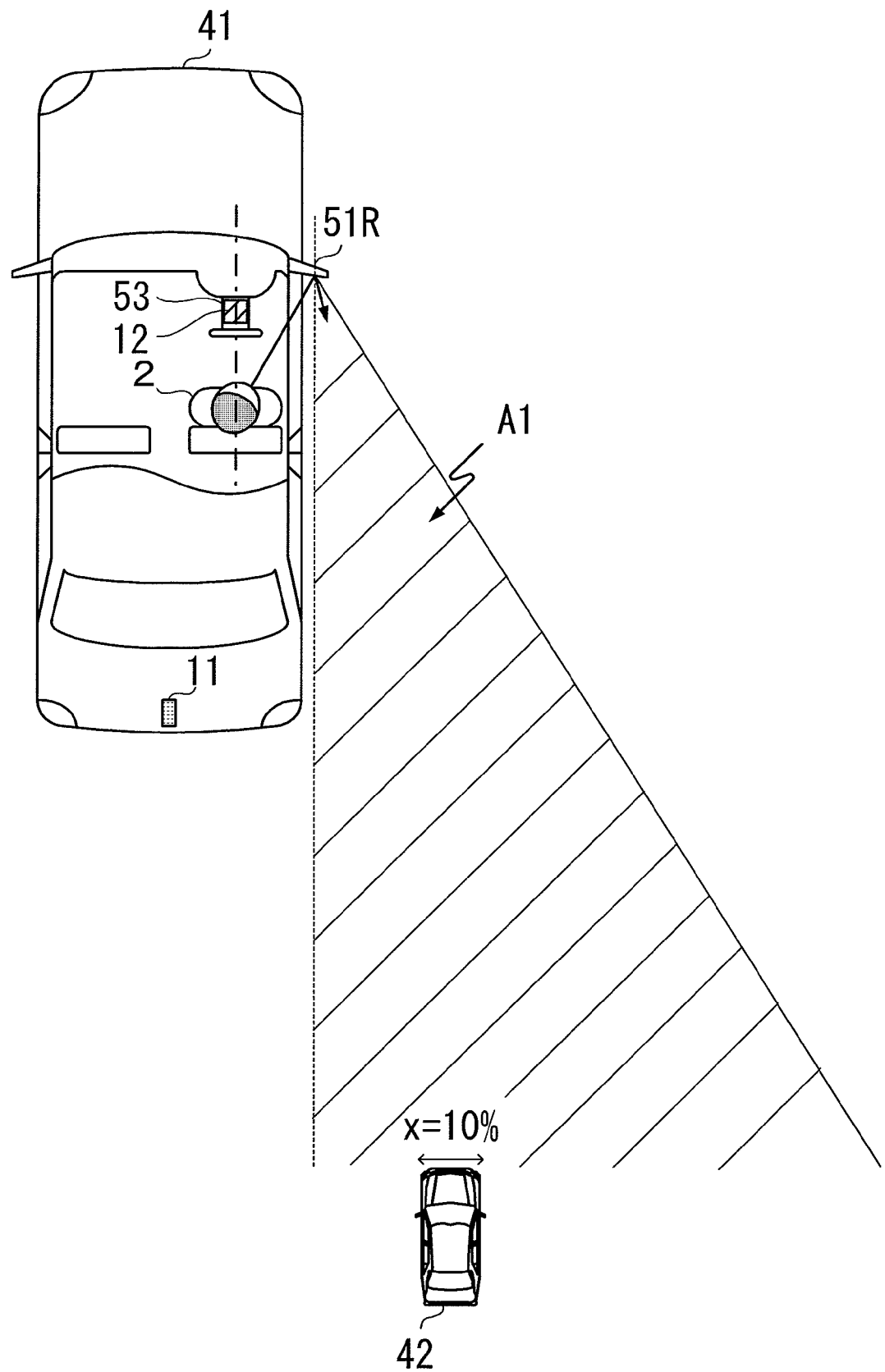
FIG. 13 is a diagram illustrating a specific operation (2) of the warning device for the vehicle.

Further, in a condition where the objective vehicle 42 approaches the subjective vehicle 41 to a position as indicated in FIG. 13, the reflection amount x is assigned as 10% and the gazing time t is assigned as $0.5 < t \leq 1.0$ (seconds). When the CPU 20 refers to the table illustrated in FIG. 5 (the process in Step S24), the warning level Lv is assigned as "9". Therefore, the CPU 20 sets the warning level Lv as "9" (the process in Step S25). Then, the CPU 20 controls the display portion 15 and the speaker 16 to output the warning signals at the set warning level Lv (the process in Step S16).

Figure 14A:
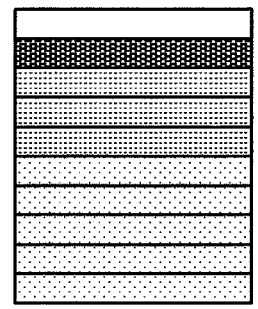
FIGS. 14(a), 14(b) and 14(c) are diagrams illustrating the set warning level of the warning signal generated in a condition of the specific operation (2)
Figure 14B:
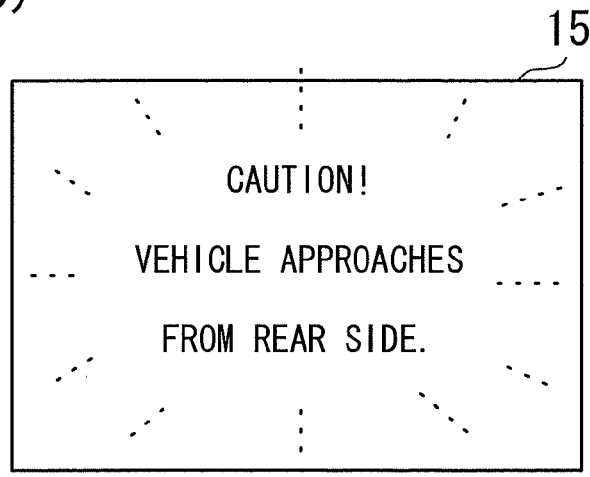
Figure 14C:

The speaker 16 outputs the sound with a volume corresponding to the warning level Lv which is set as "9" as illustrated in FIG. 14(a), for example (i.e., with a volume which is greater than the volume corresponding to the warning level Lv set as "4", for example). Further, the display portion 15 displays the message thereon in a blinking manner as illustrated in FIG. 14(b) or by enlarging a part of the message (such as "Caution!") displayed thereon as illustrated in FIG. 14(c), as an example. Thus, the display portion 15 displays the indications in a more attractive manner for drawing the attention of the operator 2 in comparison with the indications illustrated in FIG. 12(b).

According to the embodiment described above, in a condition where the objective vehicle 42 approaches the subjective vehicle 41 from the rear side thereof, the CPU 20 is arranged to obtain the visual line direction θ2 of the operator 2 and to set the warning level on the basis of the gazing time t and the mirror reflection amount x of the objective vehicle 42. Accordingly, the warning signals are appropriately generated to warn the operator 2 of the subjective vehicle 41.

Various modifications may be made to the operation of the present invention, and the invention is not limited to the particular embodiments disclosed. For example, according to the above described embodiment, the CPU 20 sets the warning level on the basis of the gazing time t and the mirror reflection amount x by referring to the table of the ROM 19. Alternatively, the CPU 20 may set the warning level on the basis of either the gazing time t or the mirror reflection amount x. Further, the data of the table illustrated in FIG. 5 is used as an example. Therefore, the data of the table is not limited to be designed with the gazing time t, the mirror reflection amount x and the warning level.

Further, in place of recognizing whether or not the visual line of the operator 2 is directed towards the door mirror 51L/51R, the CPU 20 may set the warning level on the basis of the distance information obtained by the radar 11. In other words, in a condition where the objective vehicle 42 is distanced from the subjective vehicle 41, the CPU 20 may set the lower warning level. In accordance with the approach of the objective vehicle 42, the CPU 20 may set the warning level to be higher.

A method for calculating the visual line direction θ2 of the operator 2 is not to be limited to the embodiment described above. For example, the specific angle of the face of the operator 2 may be obtained by detecting a position where a central point between centers of right and left eyes is located around a central portion of the face of the operator 2, thereby obtaining the visual line direction θ2 of the operator 2.

According to the embodiment described above, a condition where the objective vehicle 42 travels at the right-rear side of the subjective vehicle 41 is explained. In the same manner, the above described embodiment is applicable to a condition where the objective vehicle 42 travels at a left-rear side of the subjective vehicle 41.

According to the embodiment described above, a vehicle is assigned as the obstacle. However, the obstacle is not limited to be the vehicle. Alternatively, arrangement on a road, such as a telegraph pole, a tree, a shrubbery, and the like, may be assigned as the obstacle. Further, the above described embodiment is applicable for reversing the subjective vehicle 42.

According to the embodiment described above, the radar 11 is employed for detecting the objective vehicle 42 as the obstacle. Alternatively, a camera may be employed for detecting the objective vehicle 42.

Further, a mirror for reflecting an image of the obstacle is not limited to be the door mirror 51L/51R. Alternatively, a side mirror(s) and a room mirror may be employed as the mirror for reflecting the image of the obstacle. When employing the room mirror, the warning device for a vehicle may act not only for the objective vehicle 41 located at the left/right-rear side of the subjective vehicle 42 but also for an objective vehicle located at a central rear side of the subjective vehicle 42. Still further, a combinative operation of the door mirror 51L/51R and the room mirror may be employed.

According to the embodiment described above, the display portion 15 and the speaker 16 are employed as a warning signal outputting means. Alternatively, the warning device 1 for the vehicle may include a light emitter, such as an LED (Light Emitting Diode), for generating light. In such a condition, the warning device 1 may determine a light intensity and a blinking interval and may blink the light emitter at the determined light intensity and the blinking interval.

Further, the warning device 1 for the vehicle may output the warning signal by a combinative operation of any of the display portion, the speaker and the light emitter, on the basis of the set warning level.

This application is based on Japanese Patent Application 2006-268779, filed on Sep. 29, 2006, the specification, claims and drawings of which are incorporated herein by reference.

INDUSTRIAL APPLICABILITY

According to the present invention, when detecting an obstacle positioned at a rear side of a vehicle, a warning signal is generated at an appropriate warning level in accordance with a condition. Accordingly, the present invention is highly applicable to a warning device mounted onto a vehicle such as an automobile, a motorcycle, and the like.

The invention claimed is:
1. A warning device for a vehicle, comprising:
an obstacle detecting portion detecting an obstacle located at a rear side of the vehicle;

a warning signal outputting portion outputting a warning signal when the obstacle is detected by the obstacle detecting portion;

a mirror reflecting an image of the obstacle;

a visual line direction recognizing portion recognizing a visual line direction of an operator of the vehicle;

a determining portion determining whether or not the visual line of the operator is directed towards the mirror on the basis of the visual line direction of the operator recognized by the visual line direction recognizing portion; and a warning level setting portion setting a warning level of the warning signal to be outputted by the warning signal outputting portion in accordance with a determined result of the determining portion.

2. A warning device for a vehicle according to claim 1, wherein the determining portion determines whether or not the visual line of the operator is directed towards the mirror on the basis of the visual line of the operator recognized by the visual line direction recognizing portion and recognizes a visual line directed degree of the operator towards the mirror, and the warning level setting portion sets the warning level of the warning signal to be outputted by the warning signal outputting portion on the basis of the visual line directed degree of the operator recognized by the determining portion.

3. A warning device for a vehicle according to claim 2, wherein the warning level setting portion lowers the warning level of the warning signal to be outputted by the warning signal outputting portion in accordance with an increase of the visual line directed degree of the operator.

4. A warning device for a vehicle according to claim 2, wherein the determining portion determines the visual line directed degree of the operator on the basis of a time in which the visual line of the operator is directed towards the mirror.

5. A warning device for a vehicle according to claim 2, wherein the obstacle detecting portion detects the obstacle and obtains positional information of the obstacle relative to the vehicle, the determining portion recognizes a reflection area of the mirror on the basis of the visual line direction of the operator recognized by the visual line recognizing portion, a ratio of an obstacle reflected area to the reflection area of the mirror on the basis of the recognized reflection area of the mirror and the positional information obtained by the obstacle detecting portion, and further recognizes the visual line directed degree of the operator towards the mirror on the basis of the recognized ratio of the obstacle reflected area to the reflection area of the mirror.

6. A warning device for a vehicle, according to claim 1, further comprising:

a memorizing portion memorizing a table for setting the warning level of the warning signal to be outputted by the warning signal outputting portion, wherein the warning level setting portion sets the warning level of the warning signal with reference to the table memorized in the memorizing portion.

7. A warning device for a vehicle, according to claim 1, further comprising an operational information obtaining portion obtaining operational information when the operator of the vehicle operates a direction indicator thereof, wherein the warning level setting portion sets the warning level of the warning signal to be outputted by the warning signal outputting portion in association with the operational information obtained by the operational information obtaining portion.

8. A warning device for a vehicle, according to claim 1, wherein the warning level setting portion sets the highest warning level of the warning signal to be outputted by the warning signal outputting portion when the determining portion determines that the visual line of the operator is not directed towards the mirror.

9. A warning device for a vehicle, comprising:

an obstacle detecting portion detecting an obstacle located at a rear side of the vehicle and measuring a distance between the vehicle and the detected object;

a warning signal outputting portion outputting a warning signal when the obstacle is detected by the obstacle detecting portion; and a warning level setting portion setting a warning level of a warning signal to be outputted by the warning signal outputting portion on the basis of the distance measured by the obstacle detecting portion.

10. A warning method for a vehicle, comprising:

an obstacle detecting step for detecting an obstacle located at a rear side of the vehicle;

a warning signal outputting step for outputting a warning signal when the obstacle is detected;

a visual line direction recognizing step for recognizing a visual line direction of an operator of the vehicle;

a determining step for determining whether or not the visual line of the operator is directed towards a mirror reflecting an image of the obstacle; and a warning level setting step for setting a warning level of the warning signal to be outputted in accordance with a result determined in the determining step.

* * * * *